(12) United States Patent
Takara

(10) Patent No.: US 7,752,307 B2
(45) Date of Patent: Jul. 6, 2010

(54) TECHNIQUE OF ANALYZING AN INFORMATION SYSTEM STATE

(75) Inventor: Maho Takara, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 11/772,302

(22) Filed: Jul. 2, 2007

(65) Prior Publication Data

US 2008/0159165 A1    Jul. 3, 2008

(30) Foreign Application Priority Data

Jul. 28, 2006    (JP)    ............... 2006-207073

(51) Int. Cl.
*G06F 15/173* (2006.01)
(52) U.S. Cl. .............. 709/224; 709/238; 370/252
(58) Field of Classification Search ............ 709/224
See application file for complete search history.

(56) References Cited

U.S. PATENT DOCUMENTS

| 5,053,950 | A | * | 10/1991 | Naganuma et al. | .......... | 718/105 |
| 5,850,386 | A | * | 12/1998 | Anderson et al. | .......... | 370/241 |
| 6,718,385 | B1 | * | 4/2004 | Baker et al. | ................ | 709/225 |
| 6,904,020 | B1 | * | 6/2005 | Love et al. | ................ | 370/252 |
| 7,330,908 | B2 | * | 2/2008 | Jungck | ............ | 709/246 |
| 7,454,494 | B1 | * | 11/2008 | Hedayat et al. | ............ | 709/224 |
| 7,492,720 | B2 | * | 2/2009 | Pruthi et al. | ................ | 370/252 |
| 2001/0003526 | A1 | * | 6/2001 | Kanehara | ................ | 370/465 |
| 2002/0078231 | A1 | * | 6/2002 | Chang et al. | ................ | 709/238 |
| 2002/0105911 | A1 | * | 8/2002 | Pruthi et al. | ................ | 370/241 |
| 2004/0128550 | A1 | | 7/2004 | Govindarajan et al. | | |
| 2005/0172153 | A1 | * | 8/2005 | Groenendaal | ................ | 713/201 |
| 2005/0188081 | A1 | * | 8/2005 | Gibson et al. | ................ | 709/224 |

(Continued)

FOREIGN PATENT DOCUMENTS

JP    07-321783    12/1995

(Continued)

OTHER PUBLICATIONS

Cisco Systems Netflow Services Export Version 9, B. Claise, Ed. Cicsco Systems, Oct. 2004.

(Continued)

*Primary Examiner*—Firmin Backer
*Assistant Examiner*—Hamza Algibhah
(74) *Attorney, Agent, or Firm*—Bond, Schoeneck & King, Shimokaji & Associates, P.C.

(57) ABSTRACT

A system for analyzing an information system connected between a plurality of information processors through a communication line, including: a capturing unit for capturing communication packets sent through the communication line; a first counting unit for extracting an attribute value representing communication attributes from each of the captured communication packets to add attribute values for each destination of the communication packets; a second counting unit for extracting an attribute value representing communication attributes from each of the captured communication packets to add attribute values for each source of the communication packets; and a determining unit for determining which of a server function and a client function uses a TCP/UDP port of each of the information processors on the basis of the total attribute value for communication packets addressed to the TCP/UDP port and the total attribute value for communication packets sent from the TCP/UDP port.

1 Claim, 14 Drawing Sheets

U.S. PATENT DOCUMENTS

| | | | |
|---|---|---|---|
| 2006/0109795 A1* | 5/2006 | Kamata et al. | 370/252 |
| 2007/0011317 A1* | 1/2007 | Brandyburg et al. | 709/224 |
| 2007/0260732 A1* | 11/2007 | Koretz | 709/226 |
| 2008/0198759 A1* | 8/2008 | Harmel et al. | 370/252 |

FOREIGN PATENT DOCUMENTS

| | | |
|---|---|---|
| JP | 2000-092052 | 3/2000 |
| JP | 2002-261799 | 9/2002 |
| JP | 2002531014 T | 9/2002 |
| JP | 2003-023464 | 1/2003 |
| JP | 2003-087255 | 3/2003 |
| JP | 2004-200773 | 7/2004 |
| JP | 2005167347 | 6/2005 |
| JP | 2006512856 T | 4/2006 |
| WO | WO00/31963 | 6/2000 |

OTHER PUBLICATIONS

InMon Corporation's sFlow: A Method for Monitoring Traffic in Switched and Routed Networks, P. Phaal InMon Corp. Sep. 2001.

Application of Sampling Methodologies to Network Traffic Characterization.

Configuring the Catalyst Switched Port Analyzer (SPAN), www.cisco.com/warp/customer/473/41.html (1 fo 29)[Jun. 14, 2004 1:14:36 PM].

Netflow; Cisco Systems, Inc. 1992-2004.

* cited by examiner

FIG. 4a

COUNTING RESULT OF X.X.X.74  370

| PORT NO. | PROTOCOL | TRANSMIT | | | RECEIVE | | | DETERMINATION RESULT |
|---|---|---|---|---|---|---|---|---|
| | | PACKET | OCTET | SYN, ACK | PACKET | OCTET | SYN, ACK | |
| 23 | TCP | 2713 | 2217921 | 17 | 2563 | 975462 | 0 | SERVER |
| 135 | TCP | 1700 | 1351113 | 18 | 1676 | 568756 | 0 | SERVER |
| 5000 | TCP | 924 | 246487 | 9 | 1146 | 69783 | 0 | SERVER |
| ...... | ...... | | ...... | | | ...... | | ...... |

ACCESS DESTINATION OF X.X.X.74:23

| No. | IP ADDRESS | PORT NO. | TRANSMIT | | RECEIVE | |
|---|---|---|---|---|---|---|
| | | | PACKET | OCTET | PACKET | OCTET |
| 1 | X.Y.Y.25 | 1333 | 30 | 1800 | 25 | 12115 |
| 2 | X.X.X.120 | 1321 | 1 | 60 | 1 | 60 |
| 3 | X.X.X.122 | 1330 | 127 | 7659 | 97 | 14175 |
| 4 | X.Y.X.31 | 1331 | 92 | 5520 | 70 | 30690 |
| ...... | ...... | ...... | ...... | ...... | ...... | ...... |

395

| IP ADDRESS | HOST NAME | INSTALLATION SITE | FUNCTION |
|---|---|---|---|
| X. X. X. 74 | AAA | IN-HOUSE SERVER ZONE A | CALCULATE XX |
| X. X. X. 76 | BBB | IN-HOUSE SERVER ZONE B | MANAGE YY |
| ⋮ | ⋮ | ⋮ | ⋮ |

| IP ADDRESS | X. X. X. 74 | | | | |
|---|---|---|---|---|---|
| HOST NAME | AAA | | | | |
| INSTALLATION SITE | IN-HOUSE SERVER ZONE A | | | | |
| FUNCTION | CALCULATE XX | | | | |
| PORT NUMBER | PROTOCOL | SERVICE | TRANSMITTED PACKETS | RECEIVED PACKETS | DETERMINATION RESULT |
| 23 | TCP | Telnet | 270 | 240 | SERVER |
| 135 | TCP | RPC | 81 | 84 | SERVER |
| 5000 | TCP | XX | 86446 | 86989 | SERVER |
| ...... | ...... | ...... | ...... | ...... | ...... |

TECHNIQUE OF ANALYZING AN INFORMATION SYSTEM STATE

PRIORITY CLAIM

The present application claims priority to Japanese Application Serial No. 2006-207073, filed Jul. 28, 2006. the entirety of which is hereby incorporated by reference.

TECHNICAL FIELD

The present invention relates to a technique of analyzing an information system state, and more specifically, it relates to a technique of analyzing an information system state on the basis of data about communication packets sent on a network.

BACKGROUND ART

Recent information systems have been configured by combining thousands to tens of thousands of information processors. Thus, maintenance and operation thereof is a big business challenge. Meanwhile, various types of computer viruses have been newly discovered. This causes unauthorized network traffic in some cases. In such cases, services must be shut down. To avoid such a situation, a conventional technique uses any resident agent software component for monitoring information processors' operations to analyze an operation state of each information processor.

However, in recent information systems that provide services using many information processors in combination, it is necessary to know how the plural information processors cooperate with one another as well as manage the individual information processors. If the individual information processors are provided with the resident agent software component to realize the above, there is a possibility that the information system cannot operate normally due to a processing load of the agent software component itself and a load of processing for collecting monitoring results from the agent software.

Existing techniques of analyzing an information system state without preventing an information system from operating normally are listed below as a cited technique (see Patent Documents 1 to 4, and Non-Patent Documents 1 to 5, infra). The techniques of Non-Patent Documents 2 and 3 involve installing an agent software component into a communication device such as a router or a network switch to monitor communication traffic or the like. According to these techniques, it is not necessary to install the agent software component into each information processor. However, the following problem occurs. That is, settings of the existing communication device should be changed or the processing load of the communication device increases (see Non-Patent Document 4).

In contrast, Non-Patent Document 1 proposes a technique of reducing a processing load of the communication device in combination with a sampling system. Non-Patent Document 5 proposes a method of extracting a replicated data of communication packets from a switching hub to minimize the load of the communication device. Further, as a cited technique, Patent Document 3 proposes a method of collecting communication packets by use of a software component. Patent Document 4 proposes a method of reducing a load of an information processor when the processor collects communication packets. Further, Patent Documents 1 and 2 propose a technique of analyzing data about collected communication packets and uses the analysis result for monitoring an information system. Further, a system for capturing communication packets sent on a network to analyze a pattern of each packet to detect threats to the information system has been developed.

[Patent Document 1] Japanese Unexamined Patent Application Publication No. 7-321783
[Patent Document 2] Japanese Unexamined Patent Application Publication No. 2002-261799
[Patent Document 3] Japanese Unexamined Patent Application Publication No. 2003-87255
[Patent Document 4] Japanese Unexamined Patent Application Publication No. 2003-23464
[Non-Patent Document 1] K. C. Claffy, G. C. Polyzos, and H-W Braun, Application of Sampling Methodologies to Network Traffic Characterisation. In Proceedings of ACM SIGCOMM'93, San Francisco, Calif., September 1993. (p 65)
[Non-Patent Document 2] RFC 3176 InMon Corporation's Flow: A Method for Monitoring Traffic In Switched and Routed Networks
[Non-Patent Document 3] RFC 3957 Cisco Systems NetFlow Services Export Version 9
[Non-Patent Document 4] Cisco Systems Performance Analysis based on WhitePaper NetFlow
[Non-Patent Document 4] Cisco Systems Document-Id 10570 Configuring the Catalyst Switched Port Analyzer (SPAN) Feature P24

However, there are various threats to an information system such as infection with computer virus to each information processor or a failure in hardware component of each information processor in addition to threats from the outside. Therefore, ex-post detection of threats from the outside is no longer sufficient. It is desirable to take a countermeasure on the assumption that an abnormality such as a failure or attack occurs before the occurrence of the abnormality. In particular, in recent information systems that provide services using many information processors in combination, it is necessary to know how the plural information processors cooperate with one another as well as manage the individual information processors.

Consider that any information processor is inoperable, for example. If the number of other information processors linked with the processor or the number of users of the processor are grasped, these pieces of information can be used for improving the system configuration or the like. However, in most large-scale information systems, correspondence among the information processors cannot be correctly grasped even by a system administrator. In particular, in the case the configuration is frequency changed along with change in business environment or development in information technology, it is difficult to keep up with the configuration change. None of the above cited techniques correctly grasp the current configuration or configuration change.

OBJECTS AND ADVANTAGES OF THE PRESENT INVENTION

Accordingly, a primary object and advantage of the present invention is to provide a system, method, and program product that overcomes the above problems. Other objects and advantages of the present invention will in part be obvious, and in part appear hereinafter.

SUMMARY OF THE INVENTION

To attain the above object, the Inventors obtained a device for analyzing an information system connected between a plurality of information processors through a communication line, including: a capturing unit for capturing communication packets sent through the communication line; a first counting unit for extracting an attribute value representing communication attributes from each of the captured communication packets to add attribute values for each destination of the communication packets; a second counting unit for extracting an attribute value representing communication attributes from each of the captured communication packets to add attribute values for each source of the communication packets; and a determining unit for determining which of a server function and a client function uses a communication port (a TCP/UDP port, for an example) of each of the information processors on the basis of the total attribute value for communication packets addressed to the communication port and the total attribute value for communication packets sent from the communication port.

Incidentally, the summary of the invention does not describe all features of the present invention, and a subcombination of the features is included in the scope of the invention.

According to the present invention, it is possible to analyze an information system state with accuracy and support a countermeasure against a failure.

BRIEF DESCRIPTION OF THE DRAWINGS

The present invention will be more fully understood and appreciated by reading the following Detailed Description in conjunction with the accompanying drawings, in which:

FIG. 4a shows Example 1 of a data configuration of a determination result storing unit 370.

FIG. 4b shows Example 2 of a data configuration of a determination result storing unit 370.

FIG. 12 shows a screen display example upon the processing in S1100.

REFERENCE NUMERALS

Figure 1:
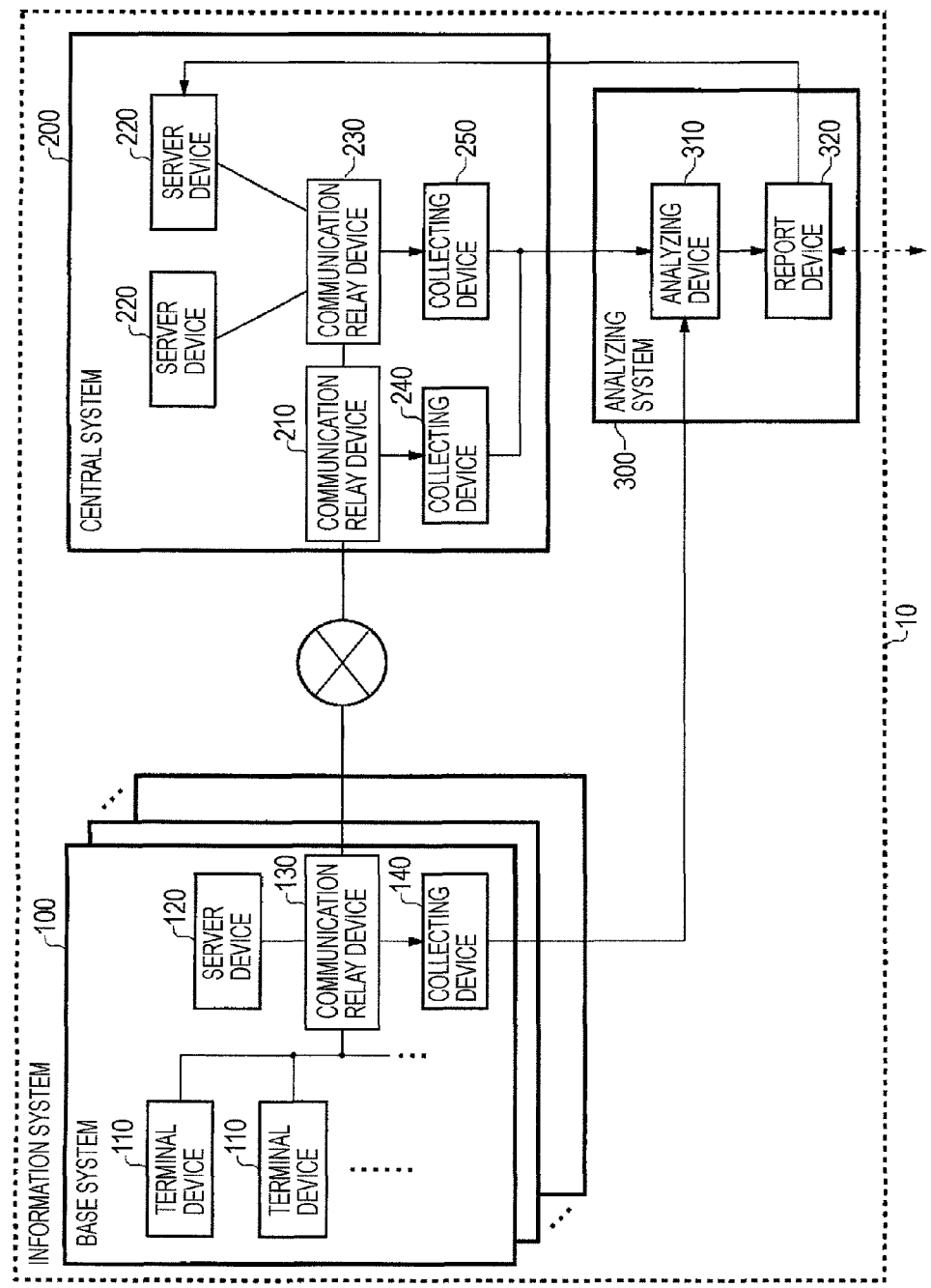
FIG. 1 shows the overall configuration of an information system 10.

10: information system
100: remote site system
110: terminal device
120: server device
130: communication equipment
140: collecting device
200: enterprise system
210: communication equipment
220: server device
230: communication equipment
240: collecting device
250: collecting device
300: analyzing system
310: analyzing device
320: report device
330: capturing unit
335: sum calculating unit
340: first counting unit
345: second counting unit
350: first calculating unit
355: second calculating unit
360: determining unit
365: third counting unit
370: determination result storing unit
375: selecting unit
380: output unit
385: setting unit
390: alarm unit
395: configuration information DB
500: computer

DETAILED DESCRIPTION OF THE BEST MODE FOR CARRYING OUT THE INVENTION

The present invention will be further illustrated with best modes for carrying out the invention (hereinafter referred to as "embodiments") below. The following embodiments are not construed as limiting the scope of the invention, and all combinations of features described in the embodiments are not necessarily indispensable as the means for solving the problems.

FIG. 1 shows the overall configuration of an information system 10. The information system 10 is, for example, an in-house information system including plural remote site systems 100, an enterprise system 200, and an analyzing system 300. The remote site systems 100 are provided for each section, and include plural terminal devices 110, server devices 120, communication equipments 130, and collecting devices 140. The terminal devices 110 are information processors provided for a staff. The terminal device 110 communicates with the server device 120 through the communication equipment 130. Further, the terminal device 110 communicates with the enterprise system 200 through the communication equipment 130. The collecting device 140 collects communication packets relayed with the communication equipment 130. For example, the collecting device 140 may collect a replicated data of sent communication packets from a mirror port of a network switch provided in the remote site system 100. To give an example thereof, the collecting device 140 may be a device conforming to the standards as defined by Non-Patent Document 2 or 3, supra. If the collecting device is provided to each remote site system 100 as well as the enterprise system 200, it is possible to detect a communication packet that spoofs a source IP address if the packet is sent from the remote site system 100 to the enterprise system 200.

The enterprise system 200 is provided in a block that exercises control over the in-house information system such as a data center. The enterprise system 200 includes a communication equipment 210, plural server devices 220, collecting devices 240, and collecting devices 250. The communication equipment 210 receives communication packets from the remote site system 100 through a communication line to transfer the received packets to the communication equipment 230. Each server device 220 is an information processor that provides services. If receiving a request from the terminal device 110 through the communication equipments 130, 210, and 230, the server device executes processing on the basis of the request and sends the processing result to the terminal device 110. Further, the server device 220 may perform processing in response to a request from the other server device 220 and send the processing result back to the other server device 220. The collecting device 240 collects communication packets relayed with the communication equipment 210 and then sends information in a packet header to the analyzing system 300. The collecting device 250 collects communication packets relayed with the communication equipment 230 and then sends information in a packet header to the analyzing system 300. The collecting device 250 as well as the collecting device 240 is provided, making it possible to correctly grasp communication conditions between the server device 220 and the other server device 220 as well as between the remote site system 100 and the enterprise system 200.

The analyzing system 300 includes an analyzing device 310 and a report device 320. The analyzing device 310 receives communication packets from the collecting devices 140, 240, and 250 to capture communication packets sent through a communication line in the information system 10. The term communication packet means only at least a part of the communication packet, for example, a header portion or means data obtained by changing a data format of the original packet. The analyzing device 310 analyzes data of the captured communication packet to derive a correspondence among the information processors in the information system 10 to output data about the correspondence to the report device 320. The report device 320 outputs the data about the correspondence in response to a user's request or warns a user if any abnormality of the information system 10 is detected.

As described above, the analyzing system 300 of this embodiment collects communication packets sent through the communication line that is connected between the information processors in the information system 10 without applying load onto the information system 10. The analyzing system 300 analyzes a correspondence of the information processors in the information system 10 on the basis of data in the communication packet to output the analysis result to a user. As a result, it is possible to support processing for preventing or eliminating a failure in the information system 10 while operating components in the information system 10.

Referring to FIGS. 2 to 14, a detailed description thereof is given below.

Figure 2:
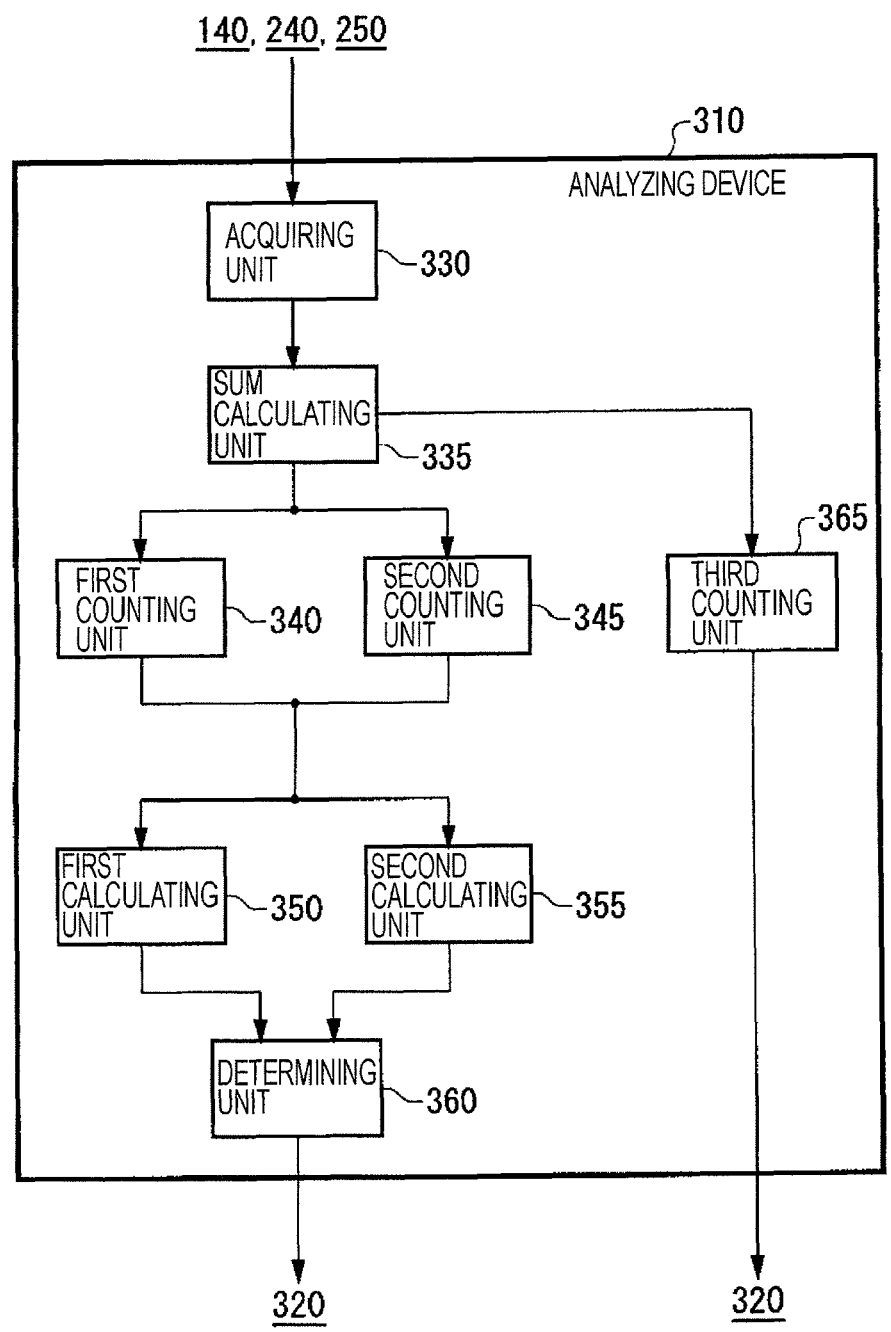
FIG. 2 is a functional block of an analyzing device 310.

FIG. 2 shows functional blocks of the analyzing device 310. The analyzing device 310 includes a capturing unit 330, a sum calculating unit 335, a first counting unit 340, a second counting unit 345, a first calculating unit 350, a second calculating unit 355, a determining unit 360, and a third counting unit 365. The capturing unit 330 causes the collecting devices 140, 240, and 250 to capture communication packets sent through the communication line in the information system 10 and then receives data about the packets from these collecting devices. The capturing unit 300 desirably receives only a header portion of each communication packet to reduce communication traffic between the remote site system 100, the enterprise system 200, and the analyzing system 300.

The first counting unit 340 extracts an attribute value representing communication attributes from each captured communication packet to add the attribute values for each destination of the communication packet. The second counting unit 345 extracts an attribute value representing communication attributes from each captured communication packet to add the attribute values for each source of the communication packet. These processings are executed in combination with the sum calculating unit 335. For example, the sum calculating unit 335 includes a counter for counting the number of communication packets, determining communication packet data size, and counting the number of communication packets where a flag is preset, for each of a pair of communication packet source and destination. For example, the counter may count the number of communication packets where an ACK flag and a SYN flag are both set in accordance with a TCP protocol. Then, the sum calculating unit 335 increments a count value regarding the number of communication packets, a communication packet data size, and the number of communication packets where a flag is preset. Then, the first counting unit 340 determines the number of communication packets calculated with the sum calculating unit 335 for each TCP/UDP port as a destination of the communication packets, as the total attribute value for the destination. Further, the second counting unit 345 determines the number of communication packets calculated with the sum calculating unit 335 for each TCP/UDP port as a source of the communication packets, as the total attribute value for the source. If the information system 10 is based on plural communication protocols, it is desirable to add attribute values for each communication protocol. Moreover, attribute values may be added up only for a preset communication protocol.

The first calculating unit 350 determines whether or not the total attribute value for communication packets addressed to the TCP/UDP port and the total attribute value for communication packets sent from the TCP/UDP port satisfy plural conditions regarding characteristics of the server function. The term TCP/UDP port means a virtual TCP/UDP port numbered to distinguish plural types of communications in one information processor. For example, the TCP/UDP port is a port for TCP. Then, the first calculating unit 350 calculates a first index value representing the degree to which the TCP/UDP port has the characteristics of the server function on the basis of the determination result. The second calculating unit 355 determines whether or not the total attribute value for communication packets addressed to the TCP/UDP port and the total attribute value for communication packets sent from the TCP/UDP port satisfy plural conditions regarding characteristics of the client function. Then, the first calculating unit 355 calculates a second index value representing the degree to which the TCP/UDP port has the characteristics of the client function on the basis of the determination result.

The determining unit 360 determines which of the server function and the client function uses a TCP/UDP port of each of the information processors on the basis of the total attribute value for communication packets addressed to the TCP/UDP port and the total attribute value for communication packets sent from the TCP/UDP port. More specifically, the determining unit 360 may determine that the client function uses the TCP/UDP port if the second index value is larger than the first index value for each TCP/UDP port and determines that the server function uses the TCP/UDP port if the first index value is larger than the second index value for each TCP/UDP port.

The third counting unit 365 adds up attribute values for all communication packets captured with the capturing unit 330 to detect an abnormality in the information system 10. For example, the third counting unit 365 counts the number of communication packets where a FIN flag is set in accordance with the TCP protocol and counts the number of communication packets where a SYN flag is set in accordance with the TCP protocol. The counting result is sent to the report device 320 and used to detect an abnormality in the report device 320.

Figure 3:
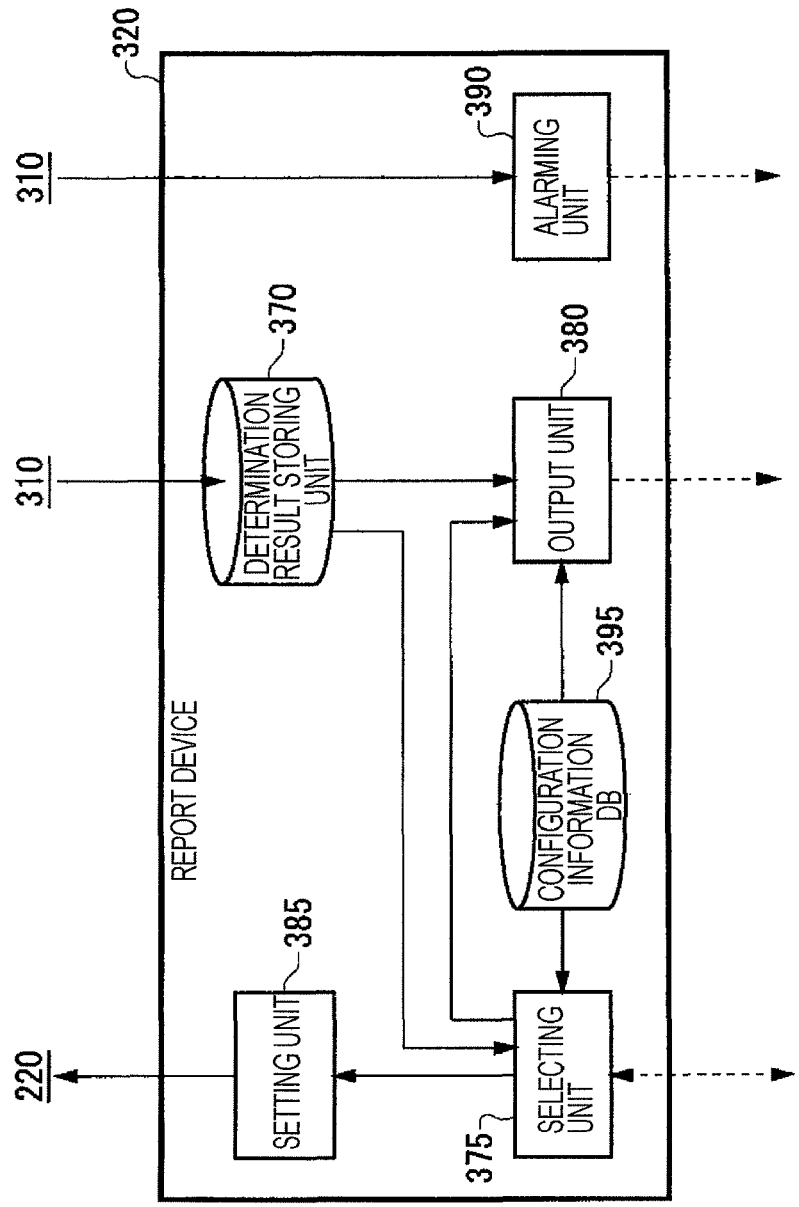
FIG. 3 is a functional block of a report device 320.

FIG. 3 shows functional blocks of the report device 320. The report device 320 includes a determination result storing unit 370, a selecting unit 375, an output unit 380, a setting unit 385, an alarm unit 390, and a configuration information DB 395. The storing unit 370 stores the determination result from the determining unit 360 together with the counting results from the first counting unit 340 and the second counting unit 345. The configuration information DB 395 stores information about the inner configuration of the information system 10. The selecting unit 375 reads information about the inner configuration of the information system 10 and displays the information for a user. For example, the selecting unit 375 may display a list of information processors in the information system 10. If a user designates any information processor, the selecting unit 375 determines a TCP/UDP port used by the server function among the TCP/UDP ports of the designated information processor on the basis of the determination result stored in the determination result storing unit 370. Then, the selecting unit 375 selects all information processors to which packets are sent from the TCP/UDP ports used by the server function, on the basis of the determination result stored in the determination result storing unit 370. The selected one is sent to the output unit 380. The output unit 380 outputs information regarding the information processor selected with the determination result storing unit 370, as information about an influence of the designated information processor if the processor stops operating. At this time, the output unit 380 may read information about an installation site of each information processor from the configuration information DB 395 to output the read information. As a result, a user can grasp the influence of the designated server device if the device stops operating, on the basis of information about the number of client devices dependent on the server device or the installation site thereof.

Under such conditions that the number of information processors selected with the selecting unit 375 (that is, client devices) is larger than a preset reference value, the setting unit 385 may distribute a processing load on the designated information processor (that is, server device) to the other information processors. This is realized by instructing a load-distributing device in the enterprise system 200, for example, the server device 220 to execute the above process. As a result, not only can the report device 320 provide necessary information to a user to indirectly change the configuration of the information system 10 but it can also directly change the configuration of the information system 10 by changing the settings.

The alarm unit 390 receives the total number of communication packets where the FIN flag is set and the total number of communication packets where the SYN flag is set from the third counting unit 365. Then, the alarm unit 390 displays an alert message to warn a user about threats in the information system 10. As a result, it is possible to properly detect a threat (DOS: Dead of service) which sends a large amount of communication packets where a SYN flag is set to a server to paralyze the server function.

The alarm unit 390 may give an alert message other than the message about the DOS. For example, the alarm unit 390 may display an alert message to warn a user of port scan that is a prelude to a cyberattack. More specifically, the third counting unit 365 counts the number of pairs of an IP address as a communication packet destination address and a TCP/UDP port for each source of the communication packets. Then, the alarm unit 390 may determine, as an IP address for port scan, a source IP address for which the number of pairs of a destination IP address and a TCP/UDP port is larger than a predetermined reference value, and display an alert message to warn a user. To give another example thereof, the storing unit 390 may detect an attack on an application protocol level. To be specific, the third counting unit 365 measures the total data size of sent communication packets and counts the number of predetermined communication packets that are sent for establishing communications. Then, if the data size of sent data is smaller than a preset reference value, the alarm unit 390 determines that communication packets of small data size are sent in large volumes to attack the system, and displays an alert message. According to the analyzing system 30 of this embodiment, attribute values of the sent communication packets can be added up, so such fraud or prelude to attack can be detected.

Referring to FIGS. 4*a* and 4*b*, specific examples of the counting result and determination result stored in the determination result storing unit 370 are described below. The determination result and the counting result can be expressed as a combination of Example 1 of FIG. 4*a* and Example 2 of FIG. 4*b*.

FIG. 4*a* shows Example 1 of the data configuration of the determination result storing unit 370. The determination result storing unit 370 stores the total attribute value for communication packets from/to a target information processor in association with each information processor. For example, the determination result storing unit 370 stores the total attribute value calculated with the second counting unit 345 for communication packets from each of the TCP/UDP ports in the "Sent" field and stores the total attribute value calculated with the first counting unit 340 for communication packets to each of the TCP/UDP ports in the "Receive" field.

In the "Sent" field, the number of communication packets addressed to the communication packet, the number of octet streams as a communication-packet data size, and the number of communication packets where the ACK flag and the SYN flag are both set are stored. In the "Receive" field as well, the number of communication packets sent from the communication packet, the number of octet streams as a communication-packet data size, and the number of communication packets where the ACK flag and the SYN flag are both set are stored. Further, the determination result storing unit 370 may store information about a communication protocol for each TCP/UDP port.

For example, 2,713 communication packets are sent to a TCP port 23 of an information processor with an IP address of X.X.X.74, and the number of octet streams is 2217921. Among those, the number of communication packets where the SYN flag and the ACK flag are both set is 17. Further, 2,563 communication packets are sent from the TCP port 23, and the number of octet streams is 975462. Among those, the number of communication packets where the SYN flag and the ACK flag are both set is 0.

The determination result storing unit 370 stores the counting result for each TCP/UDP port and in addition, stores a result of determining whether the TCP/UDP port is used by the server function or the client function. For example, the determining unit 360 determines that the server function uses the TCP port 23. In this way, the determination result may be stored as information for identifying the server or client. As another example thereof, the determination result storing unit 370 may store the first index value representing the degree to which the TCP/UDP port has the characteristics of the server function on the basis of the determination result. As a result, a user can know not only the determination result but also the degree of certainty.

FIG. 4*b* shows Example 2 of the data configuration of the determination result storing unit 370. The determination result storing unit 370 stores an attribute value of communications in accordance with the TCP/UDP ports of each information processor. This attribute value indicates an IP address of a device on the other end and a TCP/UDP port number thereof. This value is calculated with the first counting unit 340 and the second counting unit 345. That is, the first counting unit 340 counts the number of pairs of an IP address and a TCP/UDP port of a source for each destination of the communication packets (in this example, "X.X.X.74: 23", hereinafter expressed in the form of "IP address: TCP port" to specify a TCP/UDP port). Then, the first counting unit 340 stores the data in accordance with the format of FIG. 4b, in the destination result storing unit 370. Further, the second counting unit 345 counts the number of pairs of an IP address and a TCP/UDP port of a destination for each source of the communication packets (in this example, "X.X.X.74: 23"). Then, the second counting unit 345 stores the data in accordance with the format of FIG. 4b, in the destination result storing unit 370. Further, the number of communication packets sent to each destination and the number of communication packets sent from each source may be counted as an attribute value and stored in the determination result storing unit 370.

More specifically, a TCP/UDP port of X.Y.Y.25: 1333 is a destination of a communication packet sent from a TCP/UDP port of X.X.X.74: 23 as well as a source of a communication packet addressed to the TCP/UDP port of X.X.X.74: 23. The number of communication packets sent from X.X.X.74: 23 to X.Y.Y.25: 1333 is 30, and the number of octet streams is 1,800. Further, the number of communication packets sent from X.Y.Y.25: 1333 to X.X.X.74: 23 is 25, and the number of octet streams is 12,115.

Figures 5, 6:
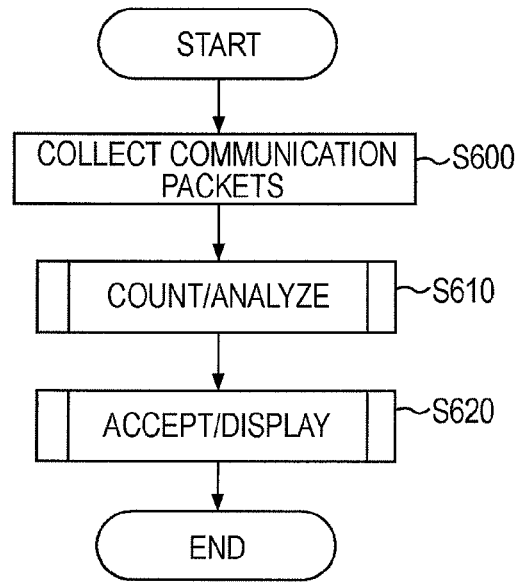
FIG. 5 shows an example of the data configuration of the configuration information DB 395.
FIG. 6 is a flowchart of a processing from the collection of communication packets with the analyzing system 300 to the display of the determination result.

FIG. 5 shows an example of the data configuration of the configuration information DB 395. The configuration information DB 395 stores, in association with each IP address, a host name of an information processor with the IP address, an installation site of the information processor, and a preset function of the information processor. These pieces of information may be previously input by a system administrator. The selecting unit 375 stores these pieces of information in association with an IP address of the information processor. As a result, a user can easily designate an information processor. Further, the output unit 380 outputs these pieces of information in association with the determination result or counting result to thereby help a user to grasp an influence of failure occurrence.

FIG. 6 is a flowchart of a processing from the collection of communication packets with the analyzing system 300 to the display of the determination result. The acquiring unit 330 collects communication packets sent through a communication line in the information system 10 by use of the collecting devices 140, 240, and 250 (S600). It is desirable to collect packets at regular intervals (for example, every 5 minutes). As a result, an influence of abnormal communication packets that are detected by chance can be suppressed while reducing a load on the collecting device and determination accuracy can be increased. Next, the first counting unit 340 or the like adds communication attribute values in accordance with the communication packets to analyze the count value to thereby determine which of the server function and the client function uses a TCP/UDP port of each of the information processors on the basis of the total attribute value for communication packets addressed to the TCP/UDP port and the total attribute value for communication packets sent from the TCP/UDP port (S610). Then, when a user designates an information processor having the server function, the selecting unit 375 informs the user of an influence of the designated information processor (S620).

Figure 7:
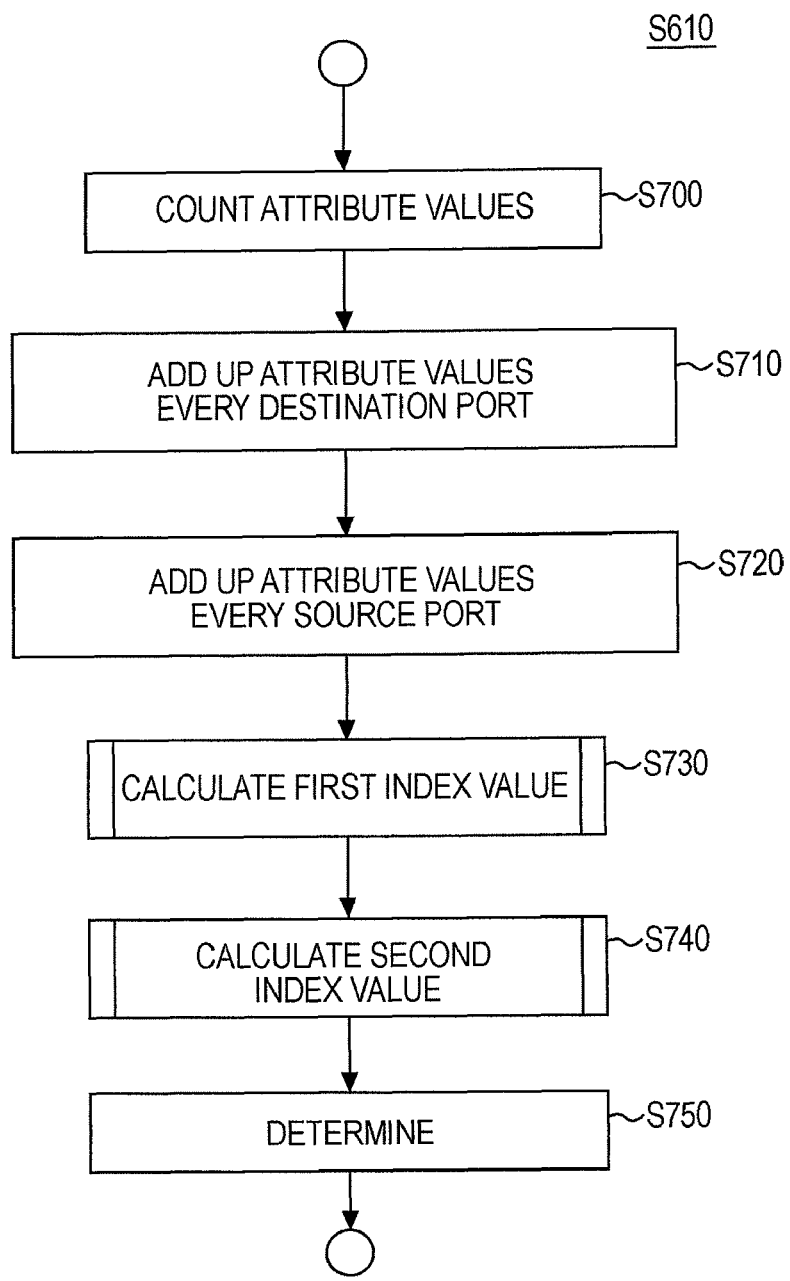
FIG. 7 is a detailed diagram of the processing in S610.

FIG. 7 is a detailed diagram of the processing in S610. The sum calculating unit 335 adds attribute values representing communication attributes for each pair of source and destination (S700). FIGS. 8(a) and 8(b) are detailed blocks of this processing.

FIGS. 8(a) and 8(b) are conceptual views of the processing in S700. As indicated by the lowest portion of FIGS. 8(a) and 8(b), the sum calculating unit 335 has a counter group associated with a flow key as an identifier for identifying a data source and a data destination. FIGS. 8(a) and 8(b) illustrate a counter group with a combination of source A and destination B and a combination of source B and destination A. To describe the counters in order from the left, the counters count the number of communication packets sent from A to B, the number of octet streams of the communication packets sent from A to B, the number of communication packets sent from B to A, the number of octet streams of the communication packets sent from B to A, the number of communication packets where a predetermined flag is set among the number of communication packets sent from A to B, and the number of communication packets where a predetermined flag is set among the number of communication packets sent from B to A.

The sum calculating unit 335 scans a header of each of the collected communication packets to acquire data about IP addresses and TCP/UDP ports of the source and destination of the communication packet. The sum calculating unit 335 compares an address value of the destination IP address with an address value of the source IP address. The sum calculating unit 335 executes a processing depicted in FIG. 8(a) under the condition that the n address value of the destination IP address is smaller than an address value of the source IP address. That is, the sum calculating unit 335 first exchanges the destination port number and the source IP address and arranges the destination IP address, the destination TCP/UDP port number, the source IP address, and the source port number in this order. Then, the sum calculating unit 335 searches for a flow key with the header portion corresponding to the combination of address and port number. In the case of counting packets for each protocol number, the sum calculating unit 335 may add the protocol number to the pair of address and port number and search for a flow key with the header portion corresponding to the combination of address and port number. If no flow key is detected, the sum calculating unit 335 generates a new flow key.

Then, the sum calculating unit 335 increments a counter that counts the number of packets among the counters corresponding to the detected flow key. Further, the sum calculating unit 335 adds a packet length to a counter for measuring the packet length among the counters corresponding to the flow key. Further, if a flag set in the collected communication packets satisfies a predetermined condition, the sum calculating unit 335 increments a counter that counts the number of communication packets satisfying the predetermined condition.

On the other hand, if the address value of the destination IP address is larger than the address value of the source IP address, the sum calculating unit 335 executes the processing as illustrated in FIG. 8(b). The sum calculating unit 335 first arranges the source IP address, the source TCP/UDP port number, the destination IP address, and the destination port number in this order. Then, the sum calculating unit 335 searches for a flow key with the header portion corresponding to the rearranged address and port number. Then, the sum calculating unit 335 calculates a counter for counting the number of packets among the counters corresponding to the detected flow key. Further, the sum calculating unit 335 may add the packet length to the counter for measuring the packet length among the counters corresponding to the detected flow key. Further, if a flag set in the collected communication packets satisfies a predetermined condition, the sum calculating unit 335 increments a counter that counts the number of communication packets satisfying the predetermined condition.

Figure 8:
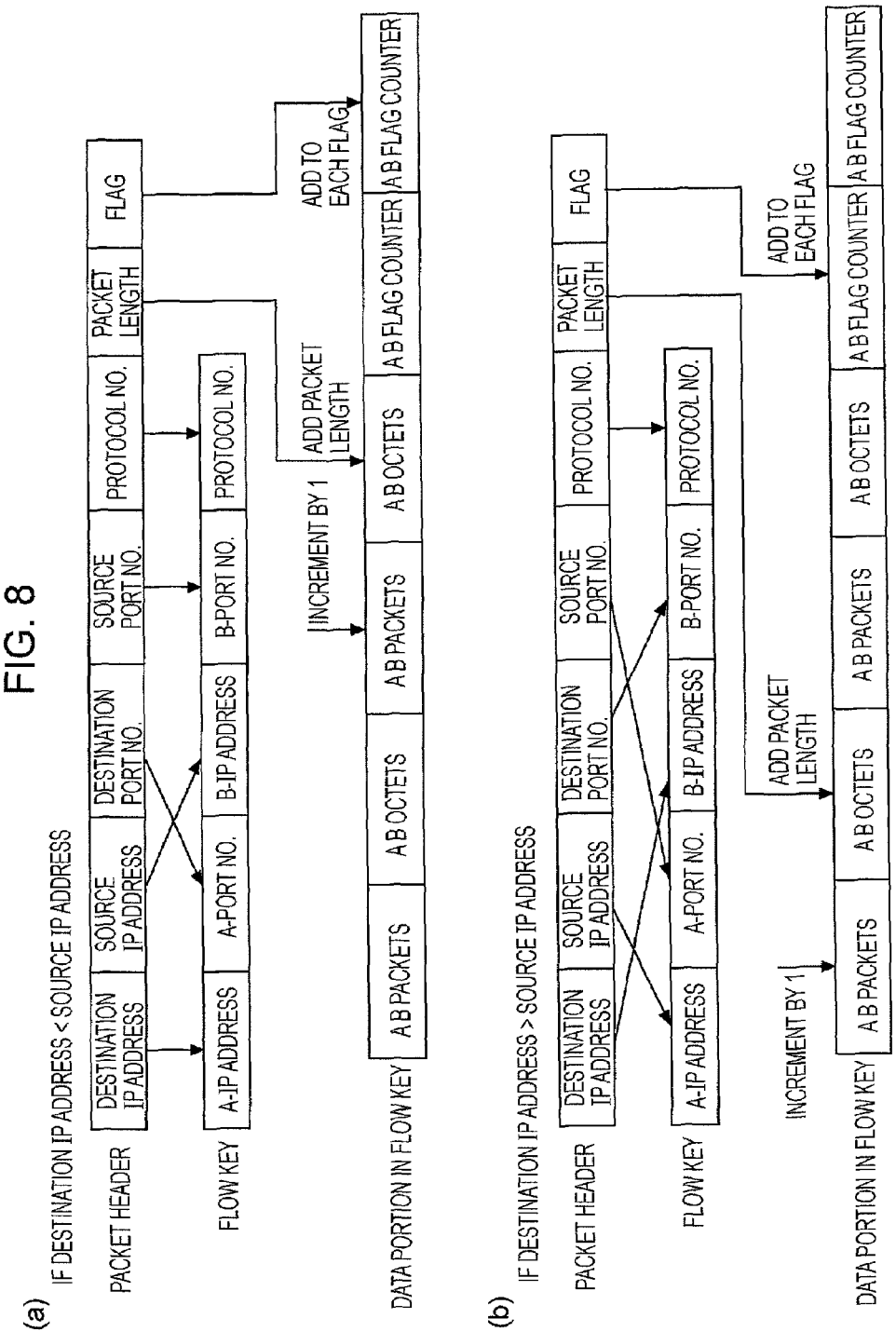
FIG. 8 are conceptual views of the processing in S700.

As described above, it is possible to grasp communication conditions between the source and destination of communication packets on the basis of each source-and-destination pair based on the flow key and counter illustrated in FIGS. 8(*a*) and 8(*b*).

The process returns to FIG. 7. The attribute values are added for each destination port with the first counting unit 340 (S710), and the second counting unit 345 adds the attribute values for each source port (S720). That is, the first counting unit 340 searches for a flow key with a first entry and a second entry corresponding to the pair of IP address and destination port, and a flow key with a third entry and a fourth entry corresponding to the pair of IP address and destination port. Then, the first counting unit 340 and the second counting unit 345 adds the values of entries of each detected flow key to thereby calculate the total attribute value of packets addressed to the TCP/UDP port and the total attribute value of packets sent from the TCP/UDP port.

More specifically, the first counting unit 340 may calculate the total data size of communication packets and a size on the basis of an average value for each destination of the communication packets. The second counting unit 345 may calculate the total data size of communication packets and a size on the basis of an average value for each source of the communication packets. Further, the first counting unit 340 may count the number of communication packets where an ACK flag and a SYN flag are both set for each destination of the communication packets. The second counting unit 345 may count the number of communication packets where an ACK flag and a SYN flag are both set for each source of the communication packets. The count values are stored in the destination result storing unit 370 as illustrated in FIG. 4*a*. Further, the first counting unit 340 may add values of IP address and port number of the source information processor for each destination of communication packets. The second counting unit 345 may add values of IP address and port number of the destination information processor for each source of communication packets. The count values are stored in the determination result storing unit 370 as illustrated in FIG. 4*b*.

The first calculating unit 350 calculates the first index value representing the degree to which each TCP/UDP port has the characteristics of the server function on the basis of the count value (S730). The second calculating unit 355 calculates the second index value representing the degree to which each TCP/UDP port has the characteristics of the client function on the basis of the count value (S740). Then, the determining unit 360 determines which of the server function and the client function uses the TCP/UDP port of each of the information processors on the basis of the first index value and the second index value (S750). If the first index value and the second index value are equal, the determining unit 360 may send a determination result that determination cannot be performed.

Figure 9:
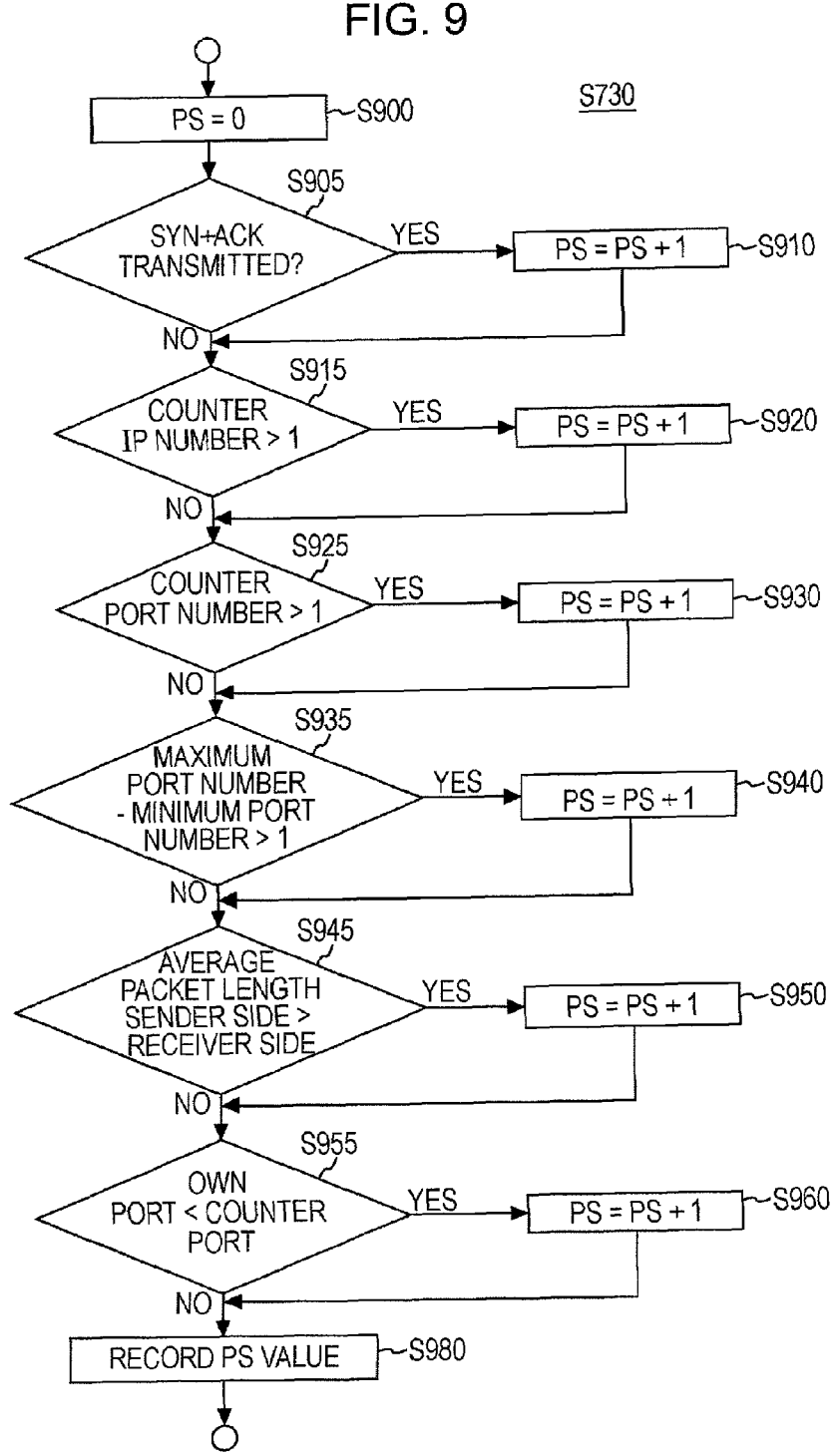
FIG. 9 is a detailed diagram of the processing in S730.

FIG. 9 is a detailed diagram of the processing in S730. The first calculating unit 350 prepares a variable PS for storing the first index value of each TCP/UDP port. Then, the following processing is executed on the variable PS of each TCP/UDP port. First, the first calculating unit 350 sets the variable Ps to 0 (S900). Next, the first calculating unit 350 determines whether or not an ACK flag and a SYN flag are both set in any of communication packets sent from the TCP/UDP port (S905). If the ACK flag and the SYN flag are both set (S905: YES), 1 is added to the variable PS (S910). Incidentally, this processing is given by way of example, and the first calculating unit 350 may add a larger value to the variable PS in accordance with the number of communication packets where the ACK flag and the SYN flag are both set. That is, under such conditions that the total number of communication packets where the ACK flag and the SYN flag are both set is larger than a reference value, the first calculating unit 350 may select a larger value as the first index value.

Next, the first calculating unit 350 determines whether or not the total number of destination IP addresses of communication packets sent from the TCP/UDP port and source IP addresses of communication packets addressed to the TCP/UDP port is larger than 1 (S915). If the number is larger than 1 (S915: YES), the first calculating unit 350 adds 1 to the variable PS (S920). Incidentally, this processing is given by way of example, and the first calculating unit 350 may add a larger value to the variable PS in accordance with the total number of communication packets. That is, under such conditions that the total number of destination IP addresses of communication packets sent from the TCP/UDP port and source IP addresses of communication packets addressed to the TCP/UDP port is larger than a reference value, the first calculating unit 350 may select a larger value as the first index value.

Next, the first calculating unit 350 determines whether or not the total number of destination TCP/UDP ports of communication packets sent from the TCP/UDP port and source TCP/UDP ports of communication packets addressed to the TCP/UDP port is larger than 1 (S925). If the number is larger than 1 (S925: YES), the first calculating unit 350 adds 1 to the variable PS (S930). Next, the first calculating unit 350 retrieves the maximum port number and the minimum port number among the destination TCP/UDP ports of communication packets sent from the TCP/UDP port and the source TCP/UDP ports of communication packets addressed to the TCP/UDP port, and determines whether or not a difference between the maximum number and the minimum number is larger than 1 (S935). If the difference is larger than 1 (S935: YES), the first calculating unit 350 adds 1 to the variable PS (S940). Incidentally, this processing is given by way of example, and the first calculating unit 350 may add a larger value to the variable PS in accordance with the total number of communication packets. That is, under such conditions that the total number of destination TCP/UDP ports of communication packets sent from the TCP/UDP port and source TCP/UDP ports of communication packets addressed to the TCP/UDP port is larger than a reference value, the first calculating unit 350 may select a larger value as the first index value.

Next, the first calculating unit 350 calculates an average packet length (hereinafter referred to as "sent packet length") of communication packets sent from the TCP/UDP port, and calculates an average packet length (hereinafter referred to as "received packet length) of communication packets addressed to the TCP/UDP port (S945). More specifically, the first calculating unit 350 calculates an average packet length by dividing the number of octet streams of the communication packets sent from the TCP/UDP port by the number of communication packets sent from the TCP/UDP port. Further, the first calculating unit 350 calculates an average packet length by dividing the number of octet streams of the communication packets addressed to the TCP/UDP port by the number of communication packets addressed to the TCP/UDP port. Then, the first calculating unit 350 determines whether or not the sent packet length is longer than the received packet length. If the sent packet length is longer than the received packet length (S945: YES), the first calculating unit 350 adds 1 to the variable PS (S950).

Incidentally, the packet length used in this processing is given by way of example, and any other index value on the basis of an average data size or the total data size of communication packets may be used instead. That is, under such conditions that the total data size or a size on the basis of the average data size of the communication packets sent from the TCP/UDP port is larger than the total size or a size on the basis of the average value of the communication packets addressed to the TCP/UDP port, the first calculating unit 350 may select a larger one as the first index value.

Next, the first calculating unit 350 determines whether or not the port number of the TCP/UDP port is smaller than a port number of an opposite TCP/UDP port (S955). The opposite TCP/UDP port is a destination TCP/UDP port of communication packets sent from the TCP/UDP port or a source TCP/UDP port of the communication packets addressed to the TCP/UDP port. If the port number of the TCP/UDP port is smaller than a port number of an opposite TCP/UDP port (S955: YES), the first calculating unit 350 sets a larger value as the first index value. For example, if the port number of the TCP/UDP port is smaller than a port number of an opposite TCP/UDP port, the first calculating unit 350 adds 1 to the variable PS (S960) or does not add 1 otherwise. Incidentally, according to communication protocols, a reserved port of a predetermined function is statically determined, so a port of relatively small number is selected in many cases. The reserved port is used for the server in many cases. On the other hand, TCP/UDP ports for the client are dynamically numbered, so relatively large numbers other than the port numbers of reserved ports are assigned in many cases. The first calculating unit 350 can calculate the first index value through the comparison between the port numbers on the basis of such numbering.

The first calculating unit 350 records the variable PS as the first index value upon the completion of the above processing (S980).

Figure 10:
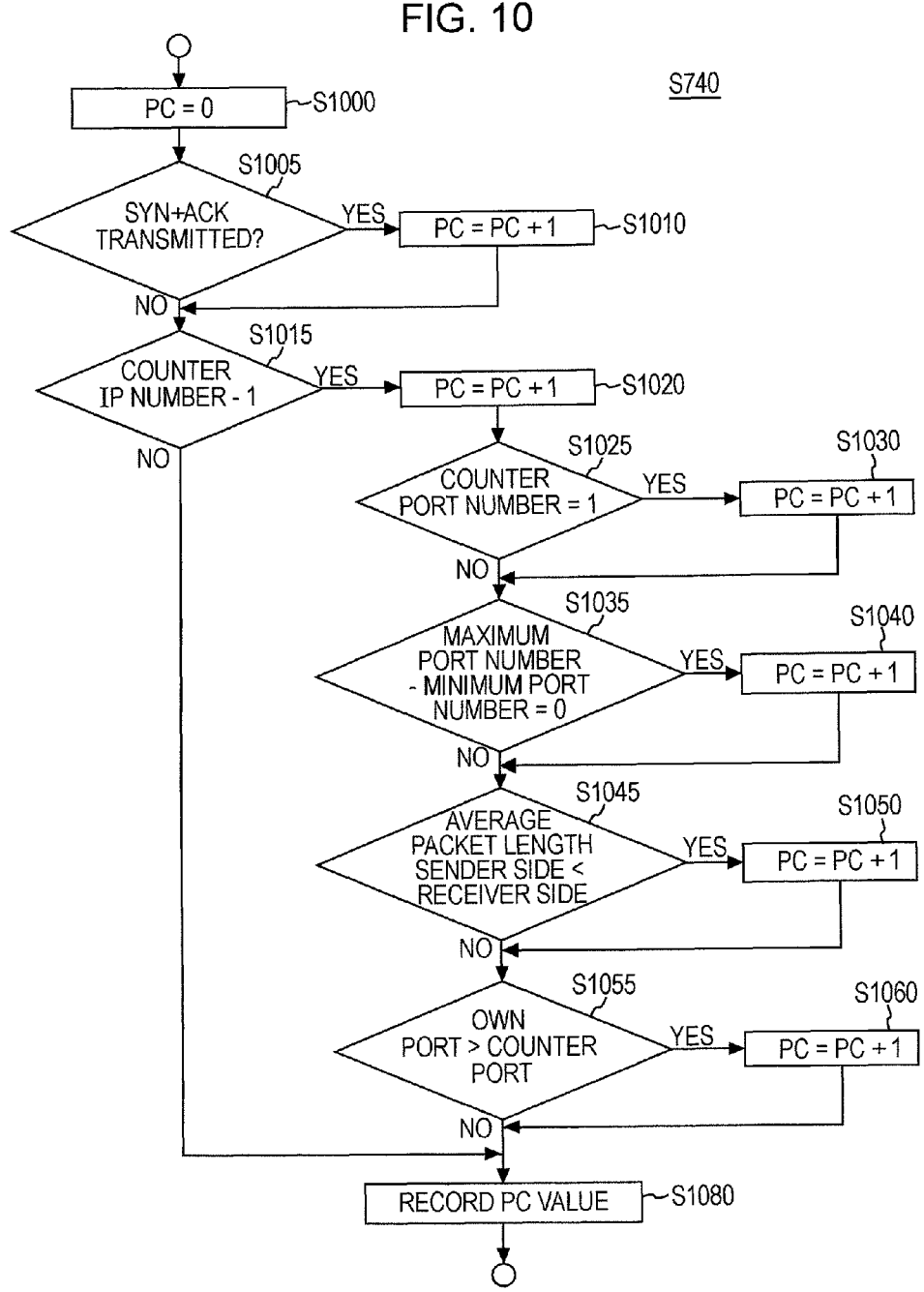
FIG. 10 is a detailed diagram of the processing in S740.

FIG. 10 is a detailed diagram of the processing in S740. The second calculating unit 355 prepares a variable PC for storing the second index value of each TCP/UDP port. Then, the following processing is executed on the variable PC of each TCP/UDP port. First, the second calculating unit 355 sets the variable PC to 0 (S1000). Next, the second calculating unit 355 determines whether or not an ACK flag and a SYN flag are both set in any of communication packets addressed to the TCP/UDP port (S1005). If the ACK flag and the SYN flag are both set (S1005: YES), 1 is added to the variable PC (S1010). Incidentally, this processing is given by way of example, and the second calculating unit 355 may add a larger value to the variable PS in accordance with the number of communication packets where the ACK flag and the SYN flag are both set. That is, under such conditions that the total number of communication packets where the ACK flag and the SYN flag are both set among the communication packets addressed to the TCP/UDP port is larger than a reference value, the second calculating unit 355 may select a larger value as the second index value.

Next, the second calculating unit 355 determines whether or not the total number of destination IP addresses of communication packets sent from the TCP/UDP port and source IP addresses of communication packets addressed to the TCP/UDP port is 1 (S1015). If the number is not 1 (S1015: NO), the second calculating unit 355 stores the current variable PC as the second index value (S1080) to complete the processing of FIG. 10. On the other hand, if the number is 1 (S1015: YES), the second calculating unit 355 adds 1 to the variable PC (S1020). Incidentally, this processing is given by way of example, and the second calculating unit 355 may add a larger value to the variable PC in accordance with the total number of communication packets. That is, under such conditions that the total number of destination IP addresses of communication packets sent from the TCP/UDP port and source IP addresses of communication packets addressed to the TCP/UDP port is smaller than a reference value, the second calculating unit 355 may select a larger value as the second index value.

Next, the second calculating unit 355 determines whether or not the total number of destination TCP/UDP ports of communication packets sent from the TCP/UDP port and source TCP/UDP ports of communication packets addressed to the TCP/UDP port is 1 (S1025). If the number is 1 (S1025: YES), the second calculating unit 355 adds 1 to the variable PC (S1030). Next, the second calculating unit 355 retrieves the maximum port number and the minimum port number among the destination TCP/UDP ports of communication packets sent from the TCP/UDP port and the source TCP/UDP ports of communication packets addressed to the TCP/UDP port, and determines whether or not a difference between the maximum number and the minimum number is 0 (S1035). If the difference is 1 (S1035: YES), the second calculating unit 355 adds 1 to the variable PC (S1040). Incidentally, this processing is given by way of example, and the second calculating unit 355 may add a larger value to the variable PC in accordance with the total number of communication packets. That is, under such conditions that the total number of destination TCP/UDP ports of communication packets sent from the TCP/UDP port and source TCP/UDP ports of communication packets addressed to the TCP/UDP port is smaller than a reference value, the second calculating unit 355 may select a larger value as the first index value.

Next, the second calculating unit 355 determines whether or not the sent packet length is shorter than the received packet length (S1045). If the sent packet length is shorter than the received packet length (S1045: YES), the second calculating unit 355 adds 1 to the variable PC (S1050). Incidentally, the packet length used in this processing is given by way of example, and any other index value on the basis of an average data size or the total data size of communication packets may be used instead. That is, under such conditions that the total data size or a size on the basis of the average data size of the communication packets sent from the TCP/UDP port is smaller than the total size or a size on the basis of the average value of the communication packets addressed to the TCP/UDP port, the second calculating unit 355 may select a larger one as the second index value.

Next, the second calculating unit 355 determines whether or not the port number of the TCP/UDP port is larger than a port number of an opposite TCP/UDP port (S1055). If the port number of the TCP/UDP port is larger than a port number of an opposite TCP/UDP port (S1055: YES), the second calculating unit 355 sets a larger value as the second index value. For example, the second calculating unit 355 may add 1 to the variable PC (s1060).

The second calculating unit 355 records the variable PC as the second index value upon the completion of the above processing (S1080).

Figure 11:
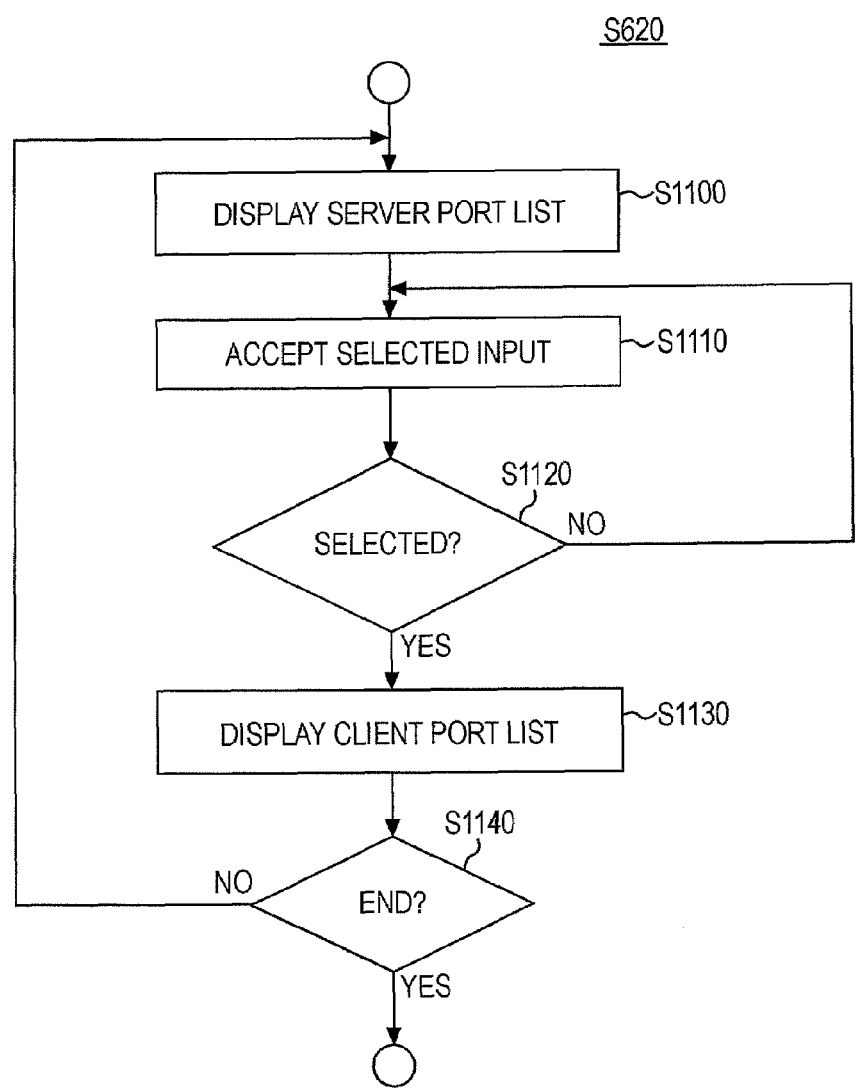
FIG. 11 is a detailed diagram of the processing in S620.
Figure 13:
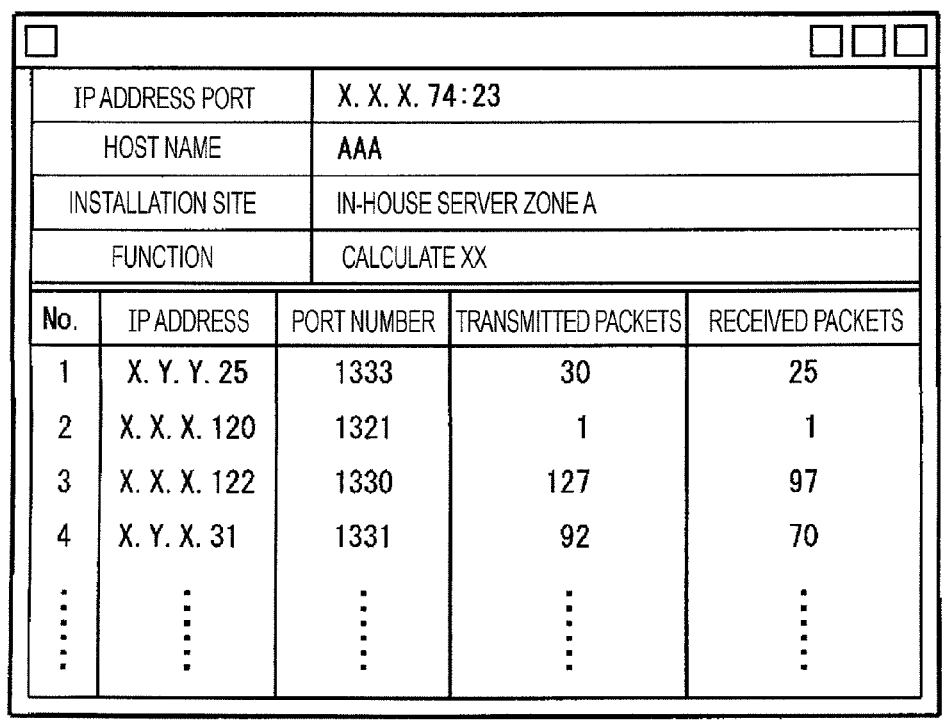
FIG. 13 shows a screen display example upon the processing in S1130.

FIG. 11 is a detailed diagram of the processing in S620. First, the output unit 380 displays a list of selectable TCP/UDP ports that are determined to be used by the server function with the determining unit 360 (S1100). FIG. 12 demonstrates a display example.

FIG. 12 shows a screen display example upon the processing in S1100. In this example, the determining unit 360 displays a list of TCP/UDP ports determined to be used by the server function as for the information processor having the IP address of X.X.X.74. For users' convenience, the determining unit 360 may display information stored in the configuration information DB 395, that is, a host name, an installation site, and function in association with the IP address.

Further, the determining unit 360 may display a communication protocol of each TCP/UDP port, and a service, packets, and determination results provided via each TCP/UDP port, in association with the number of each of the listed TCP/UDP ports. The determination result may include an index value indicating the degree to which the TCP/UDP port has characteristics of a server or client function as well as the information for distinguishing the server from the client.

The processing returns to FIG. 11. The selecting unit 375 receives an entry of selected TCP/UDP port (S1110). After the completion of this processing (S1120: YES), the selecting unit 375 selects TCP/UDP ports of all information processors that send/receive data to/from the selected TCP/UDP port. Then, the output unit 380 displays a list of the selected TCP/UDP ports as information about an influence of the designated TCP/UDP port when the port cannot be used. In addition to the listed TCP/UDP ports, the number of packets or the like may be added in association with each port. Thus, a user can properly grasp the number of information processors on the other end or communication frequencies.

The process returns to FIG. 11. If receiving an instruction to complete the operation (S1140: YES), the selecting unit 375 completes the processing of FIG. 11.

Figure 14:
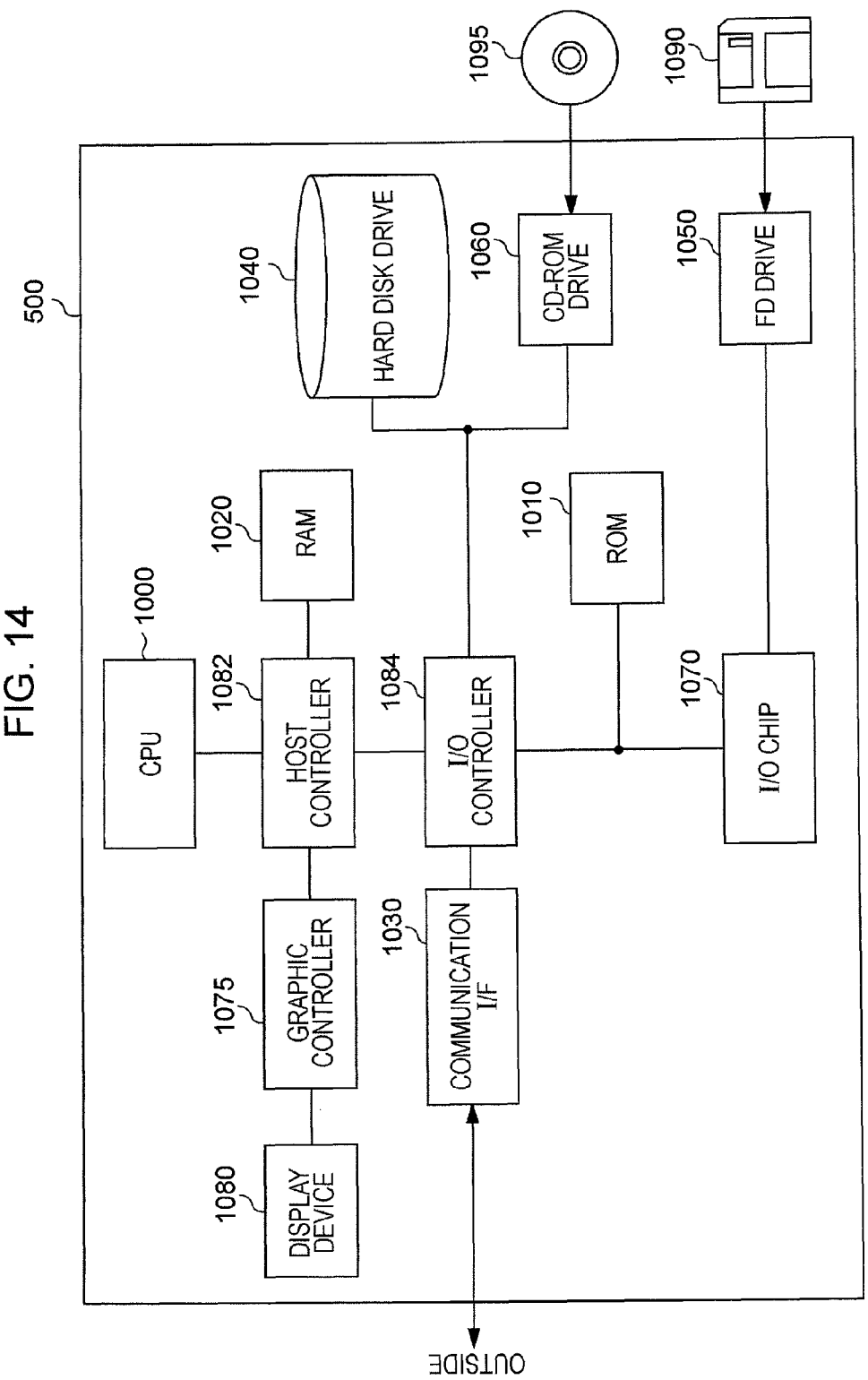
FIG. 14 shows a hardware configuration example of a computer 500 functioning as the analyzing system 300.

FIG. 14 shows a hardware configuration example of a computer 500 functioning as the analyzing system 300. The computer 500 includes a CPU peripheral unit including a CPU 1000, a RAM 1020, and a graphic controller 1075 which are connected with each other through a host controller 1082, an input/output unit including a communication interface 1030 connected to the host controller 1082 through an input/output controller 1084, a hard disk drive 1040, and a CD-ROM drive 1060, and a legacy input/output unit including an ROM 1010 connected to the input/output controller 1084, a flexible disk drive 1050, and an input/output chip 1070.

The host controller 1082 connects among the RM 1020, the CPU 1000 that accesses the RAM 1020 at a high transfer rate, and the graphic controller 1075. The CPU 1000 operates on the basis of program products stored in the ROM 1010 and the RAM 1020 and controls each block. The graphic controller 1075 retrieves image data on a frame buffer provided in the RAM 1020 by the CPU 1000 to display the data on a display device 1080. The graphic controller 1075 may include a frame buffer storing image data generated with the CPU 1000 instead.

The input/output controller 1084 connects between the host controller 1082, a communication interface 1030 as a relatively high-speed input/output unit, a hard disk drive 1040, and a CD-ROM drive 1060. The communication interface 1030 communicates with an external device through the network. The hard disk drive 1040 stores a program product or data used for the computer 500. The CD-ROM drive 1060 reads program product or data from the CD-ROM 1095 and sends the read program product or data to the RAM 1020 or hand disk drive 1040.

Further, the input/output controller 1084 is connected to the ROM 1010 and a relatively low-speed input/output device such as a flexible disk drive 1050 or an input/output chip 1070. The ROM 1010 stores a boot program product executed on the CPU 1000 at the start-up of the computer 500 or a program product dependent on hardware components of the computer 500. The flexible disk drive 1050 reads a program product or data from the flexible disk 1090 and sends the read program product or data to the RAM 1020 or hard disk drive 1040 through the input/output chip 1070. The input/output chip 1070 connects various input/output devices through a parallel port, a serial port, a keyboard port, or a mouse port, or a flexible disk 1090.

A program product for the computer 500 is stored in a recording medium such as the flexible disk 1090, the CD-ROM 1095, or IC card and installed by a user. The program product is read from the recording medium through the input/output chip and/or the input/output controller 1084 and then installed and executed on the computer 500. The program product causes the computer 500 to execute the same operations as those of the analyzing system 300 as illustrated in FIGS. 1 to 13, so description thereof is omitted here.

The above program may be stored in an external storage medium. Conceivable examples of the storage medium include, in addition to the flexible disk 1090 and the CD-ROM 1095, an optical recording medium such as DVD or PD, a photomagnetic recording medium such as MD, a tape medium, or semiconductor memory such as IC card. Further, a storage medium such as a hard disk or RAM in a server system connected to a special communication network or Internet may be used to install the program product into the computer 500 through the network.

As set forth above, according to the analyzing system 300 of this embodiment, it is possible to properly grasp correspondence between the information processors in the information system 10 through analysis of communication packets to utilize this information for prevent or eliminate a failure without preventing normal operations of the information system 10. Further, it is possible to detect an attack to the information system 10 from the outside or unauthorized communications to display an alert message to warn a user by utilizing the analysis result of communication packets. Such functions are especially effective in recent large-scale systems that have been advanced, complicated, and changed in configuration in terms of saving labor of a system administrator. For example, it is possible to detect a server where requests are concentrated, and distribute its load. In addition, since communication conditions can be correctly grasped at the time of setting or extending firewall functions, packet filtering can be executed more efficiently.

Further, according to the analyzing system 300 of this embodiment, an influence of a failure in the information system to business or society can be grasped, so a collective or preventative measure can be taken to deal with the failure. That is, it is possible to previously grasp how many users in total are influenced by a failure or whether or not the failure influences the business, so this information can be used as an index for evaluating investment value for improving reliability.

The embodiments of the present invention are described above, but the technical scope of the present invention is not limited to the embodiments. Those skilled in the art could readily change or modify the embodiments in various ways. Such changes and modifications are included in the technical scope of the present invention as understood from the scope of claims.

What is claimed is:

1. A method of analyzing a state of an information system connected between a plurality of information processors through a communication line, comprising the steps of:
    capturing communication packets to be sent through the communication line;
    identifying a data source and a data destination using a key;
    searching for the key such that a header portion of the key corresponds to an internet protocol address and port number;
    adding attribute values for each of a plurality of communication protocols for the information system used with multiple protocols to create a total attribute value for a source of the communication packets;

adding up all the attribute values for all the communication packets to detect abnormalities in the information system;

generating the key when the key is not detected;

counting packets corresponding to the key for determining communication conditions between the data source and the data destination;

extracting a first attribute value representing communication attributes from each of the captured communication packets to add attribute values for each destination of the captured communication packets;

extracting a second attribute value representing communication attributes from each of the captured communication packets to add the attribute values for each source of the captured communication packets;

determining which of a server function and a client function uses a communication port of each of the plurality of information processors, on the basis of a first total attribute value for the captured communication packets addressed to the communication port and a second total attribute value for the captured communication packets sent from the communication port, for the communication port of each of the plurality of information processors;

deriving a correspondence among the plurality of information processors in the information system;

outputting data regarding the correspondence among the plurality of information processors in the information system to a report device;

instructing a load-distributing device to distribute a processing load when the number of the plurality of information processors is larger than a predetermined value; and changing a configuration of the plurality of information processors by changing settings regarding load distribution for the plurality of information processors when the number of the plurality of information processors is larger than the predetermined value.

* * * * *